(12) United States Patent
Huang et al.

(10) Patent No.: US 9,004,169 B2
(45) Date of Patent: Apr. 14, 2015

(54) METHOD OF ISOLATING AND COMPLETING MULTIPLE ZONES WITHIN A WELLBORE

(75) Inventors: Tianping Huang, Spring, TX (US); Richard Xu, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 230 days.

(21) Appl. No.: 13/077,422

(22) Filed: Mar. 31, 2011

(65) Prior Publication Data
US 2012/0247772 A1    Oct. 4, 2012

(51) Int. Cl.
| | | |
|---|---|---|
| E21B 43/14 | (2006.01) |
| E21B 27/02 | (2006.01) |
| E21B 33/13 | (2006.01) |
| E21B 43/04 | (2006.01) |
| C04B 28/26 | (2006.01) |
| C09K 8/46 | (2006.01) |
| C09K 8/50 | (2006.01) |

(52) U.S. Cl.
CPC ............... *E21B 27/02* (2013.01); *E21B 33/13* (2013.01); *E21B 43/04* (2013.01); *C04B 28/26* (2013.01); *C09K 8/46* (2013.01); *C09K 8/50* (2013.01)

(58) Field of Classification Search
None
See application file for complete search history.

(56) References Cited

U.S. PATENT DOCUMENTS

| | | | | |
|---|---|---|---|---|
| 3,202,214 | A * | 8/1965 | McLaughlin, Jr. ............ | 166/292 |
| 4,293,440 | A * | 10/1981 | Elphingstone et al. ........ | 516/109 |
| 4,640,361 | A * | 2/1987 | Smith et al. ................... | 166/288 |
| 4,799,549 | A * | 1/1989 | Vinot et al. ................... | 166/293 |
| 7,703,552 | B2 | 4/2010 | Katagiri | |
| 2004/0031611 | A1* | 2/2004 | Huang et al. .................. | 166/292 |
| 2004/0168804 | A1* | 9/2004 | Reddy et al. .................. | 166/295 |
| 2006/0122071 | A1* | 6/2006 | Reddy et al. .................. | 507/219 |
| 2006/0213662 | A1* | 9/2006 | Creel et al. .................... | 166/286 |
| 2010/0038085 | A1* | 2/2010 | Huang .......................... | 166/295 |
| 2011/0132599 | A1 | 6/2011 | Xu | |

FOREIGN PATENT DOCUMENTS

WO    2006119129 A2    11/2006

* cited by examiner

*Primary Examiner* — Zakiya W Bates
*Assistant Examiner* — Silvana Runyan
(74) *Attorney, Agent, or Firm* — Mossman, Kumar & Tyler, P.C.

(57) ABSTRACT

A gel barrier may be created within an annulus in a one-step operation by combining two or more solutions within the annulus. The two solutions may include a first solution, such as a silicate solution, and a second solution that may be an aqueous hardener solution. Once the two solutions are combined and subsequently reacted together, the forming of a gel barrier may occur between a plurality of zones along the annulus. The gel barrier may then prevent a fluid from traveling between adjacent zones of the wellbore annulus.

15 Claims, 5 Drawing Sheets

METHOD OF ISOLATING AND COMPLETING MULTIPLE ZONES WITHIN A WELLBORE

TECHNICAL FIELD

The present invention relates to a method of generating a consolidated gel barrier within an annulus by combining at least two solutions; one solution may be a silicate solution, and another solution may be an aqueous hardener solution.

BACKGROUND

A hydrocarbon recovery operation involving drilling a wellbore into a subterranean formation would traditionally isolate the zones of a wellbore annulus, for multi-pay-zone gravel packing, with packers. This type of procedure required many trips in and out of the wellbore and translated into very high expenses for rig time.

In the past, the fracturing and gravel packing equipment was run into cased and perforated holes, along with an isolation packer. The packer was set to isolate the lowermost zone, and the isolated zone was then fractured below that packer. Thereafter, gravel would be delivered outside a screen through a crossover to fill the annular space around the screen with gravel. The packer would then remain in the zone to be gravel packed along with the screens. The crossover, and a wash pipe associated with the screens, were subsequently pulled out of the annulus through the already set packer. After isolating, fracturing, and gravel packing that zone, another trip into the wellbore would occur to gravel pack the zone adjacent to the most recent gravel packed zone. This process continued until all zones or sections of a continuous zone were isolated, fractured, and gravel packed.

It would be desirable if a method and apparatus were devised for isolating and completing multi-zone gravel packs at a reduced cost, as well as a reduced number of trips into and out of the wellbore.

SUMMARY

There is provided, in one form, a method of generating a gel barrier within an annulus that minimizes the number of trips into the wellbore, while allowing for isolation, fracturing, and gravel packing of a wellbore annulus in a single trip. The gel barrier may be formed between a plurality of adjacent zones along the annulus by combining at least two solutions within the annulus. A first solution may be a silicate solution, and a second solution may be an aqueous hardener solution.

There is further provided in another non-limiting embodiment a method of generating a gel barrier within a wellbore annulus that may include placing a first container in the annulus. The first container may have a first solution disposed therein. Once the first solution is released from the first container, the first solution may be combined with at least a second solution. Upon combining the two solutions, the first solution may react with the second solution to cause the formation of a gel barrier between a plurality of adjacent zones along the wellbore annulus.

In another embodiment, a method of generating a gel barrier within a wellbore annulus may include placing a plurality of containers into the wellbore annulus where each container houses a solution. The method may include rupturing one or more containers, allowing each container to release its solution. The released solutions may react upon being combined to form a gel barrier between a plurality of zones along the wellbore annulus.

The present methods and apparatus seek to build on the technique of multi-zone fracturing and gravel packing by creating a gel barrier between producing zones that are gravel packed together. In a non-limiting embodiment, the solutions are placed within the wellbore annulus prior to gravel-packing. An apparatus containing a washpipe may aid in practicing the method, whereby the wash pipe may have a shifting tool associated therewith. Such an apparatus is described in U.S. patent application Ser. No. 12/634,577 and incorporated herein by reference in its entirety.

These and other features of the present methods will be more readily apparent to those skilled in the art from a review of the detailed description of the embodiments and the associated drawings with the understanding that the full scope of the methods is determined by the appended claims.

DETAILED DESCRIPTION

Figure 1:
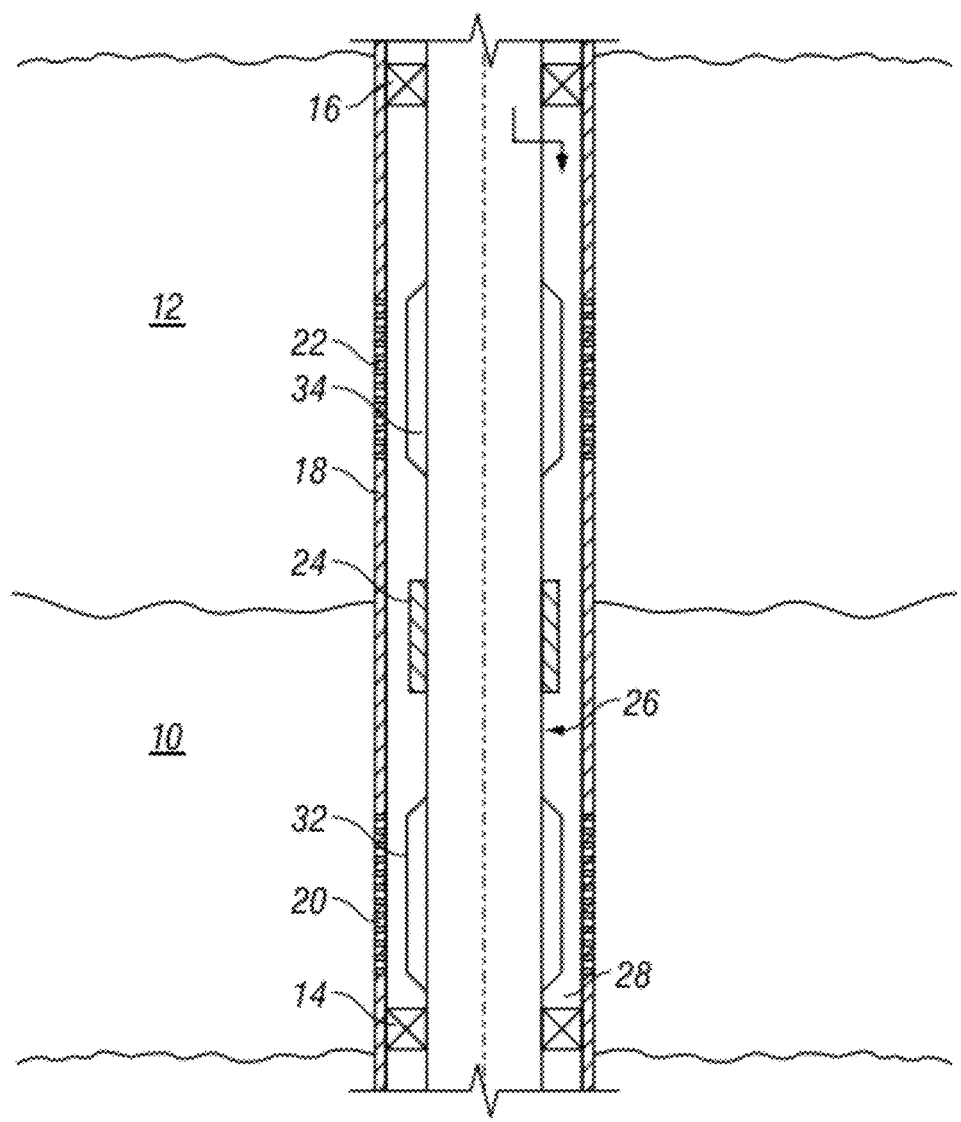
FIG. 1 is a section view of multiple zones before gravel packing to illustrate the wellbore annulus prior to the formation of a gel barrier between a plurality of adjacent zones of the wellbore annulus.

Expenses for rig time may be reduced by creating a gel barrier between zones of a wellbore annulus. The method includes combining a silicate solution and an aqueous hardener solution to react with one another, so that a gel barrier forms. The silicate solution may be a sodium silicate solution, a potassium silicate solution, a lithium silicate solution, a rubidium silicate solution, a caesium silicate solution, and mixtures thereof. The aqueous hardener solution may be selected from the group consisting of an ester solution, a lactone solution, a carboxylic acid, a di- or tri-carboxylic acid, and mixtures thereof.

In an alternative embodiment, a 2.5% sodium silicate solution may be mixed with a 40% glucono delta lactone (GDL) solution causing the pH of the mixture to decrease and form a silica gel inside of parts of a gravel pack. Thus, no swelling or absorption of fluid by a gel occurs; the two or more solutions simply harden and form a gel once the pH of the mixture is lowered to at least 8 pH. The use of GDL, a weak acid, helps maintain the uniformity of the gel. Glucono delta lactone has the formula:

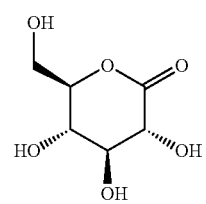 [SMILES: O=C1O[C@H](CO)[C@@H](O)[C@H](O)[C@H]1O]

In a non-limiting embodiment, the ratio of the silicate solution to the aqueous hardener solution ranges from about 200:1 independently to about 1:1 by volume of the solutions where "independently" as used herein means that any lower threshold may be combined with any upper threshold to define an acceptable alternative range. In an alternative embodiment, the range may be from about 50:1 independently to about 5:1 by volume of the solutions. Once combined, the solutions may react to form the gel barrier. The proportional makeup of the solutions may vary widely depending upon a number of factors including, but not necessarily limited to, the volume of the annulus, the annulus conditions (e.g. temperature, pressure, etc.), the particular solution components, the interaction of these various factors, and the like.

Alternatively, the gel barrier may be formed by a slightly altered method within the wellbore annulus. At least one of the solutions may be placed into the wellbore annulus by way of a container. "First container" is used herein for the purpose of referencing the container going into the wellbore annulus first. The first container may house the first solution, which may be either the silicate solution or the aqueous hardener solution. The order of the solutions going into the wellbore is insignificant.

In a non-limiting embodiment, the container(s) may be made of a material selected from the group consisting of a polymer, an elastomeric material, a rubber, a metal, a glass, a dissolvable material, or combinations thereof. Such materials allow for the first container to rupture at least a portion of the first container, such as by dissolving at least a portion of the first container, puncturing the first container, bursting the first container, and combinations thereof.

The first solution is released from the first container, the first solution may combine with at least a second solution. The solutions may react and form a gel barrier between a plurality of zones along the wellbore annulus, such as within a gravel pack. The second solution may be placed in the wellbore annulus by spraying the second solution into the wellbore annulus, injecting the second solution into the wellbore annulus, housing the second solution in a second container and placing the second container into the wellbore annulus on a drill string, and combinations thereof. The second container may be fabricated from the same or different material as the first container, as described above. The solutions may be combined at the same time; if each solution is housed in a container, then the solutions may be released at the same time or at different times to combine and form the gel barrier.

The method of generating a gel barrier within a wellbore annulus may further include more than two solutions or more than two containers being placed into the wellbore annulus to form the gel barrier without limiting the method. For example, two containers may be placed in the wellbore annulus, and a third solution may be placed in the annulus thereafter. The third solution may dissolve or rupture one or more of the containers to release the solution from the dissolved container(s). The released solution(s) may combine and react with the third solution to dissolve/rupture any undissolved container(s) until all containers are dissolved and all necessary solutions reacted in order to form the requisite gel barrier between adjacent zones of the wellbore annulus.

Another method to release each solution from each container may be caused by pushing at least one of the containers. The force caused by pushing one container may rupture at least one container. The pushing of the container may occur by applying force from a tool, applying heat, applying pressure, and combinations thereof. The ruptured container may or may not be the same container as the pushed container. The pushing tool may also have a needle or other sharp object attached thereto for puncturing one or more of the containers and releasing the fluids from the punctured containers. One skilled in the art may rupture at least one container by using a plurality of methods discussed above for rupturing the containers as long as the end result is the formation of a gel barrier in a desired location of the wellbore annulus.

It is expected that any of the methods may be effectively used at a temperature range from about 20° C. to about 150° C. The silicate solution and the aqueous hardener solution may each have very low viscosities before gelling, which allows for easy flowing within a gravel pack. Each solution may also have a wide range of gelling times and strengths depending on the type and amount of additives used just prior to use. Without wishing to be limited to any particular parameter range, it is expected that in one embodiment of the method herein, the gel strength of the gel barrier formed may range from about 500 independently to about 15,000 cP, preferably from about 1000 independently to about 10,000 cP.

A benefit of the methods and apparatus allows for the separation of a plurality of adjacent zones along an annulus. A gel barrier may be generated between each set of adjacent zones. A gel barrier may be created at the same time or at a different time as another gel barrier along the wellbore annulus. The gel barriers created may be of the same consistency or of different consistencies without limiting the embodiment where "consistency" refers to the ratio of the silicate solution to the aqueous hardener solution herein.

The methods and apparatus will be further illustrated with respect to certain embodiments. These examples are not intended to limit the methods and apparatus, but only to further describe it in certain specific, non-limiting embodiments. Now turning to the Figures, FIG. 1 is a depiction of a plurality of zones that may be gravel packed together and then isolated from each other in the wellbore annulus by formation of a gel barrier within a gravel pack between the zones.

The producing zones 10 and 12 that are isolated by a bottom packer 14 and a top packer 16 set in casing 18. Casing 18 has perforations 20 into zone 10 and perforations 22 into zone 12. Two zones are shown for illustrative purposes, but those skilled in the art will appreciate that additional zones can be gravel packed or fractured together before being isolated from each other for production. A gel barrier assembly 24 is schematically illustrated on the outer completion string 26 but can actually be located internally to the string 26. Annulus 28 is between the string 26 and the casing 18 and will be filled with gravel slurry 30 as shown in FIG. 2.

The gel barrier assembly 24 may be actuated upon the completion of the gravel pack for both zones 10 and 12. The gel barrier assembly 24 represents one or more containers where each container houses a solution. For example, the gel barrier assembly 24 may only have a first container, or the gel barrier assembly 24 may have multiple containers for use within the method as previously described.

The manner of depositing the gravel slurry is known in the art using crossover tools on the outer completion string 26 with screens 32 and 34. This is described in more detail with relation to FIG. 3.

Figure 2:
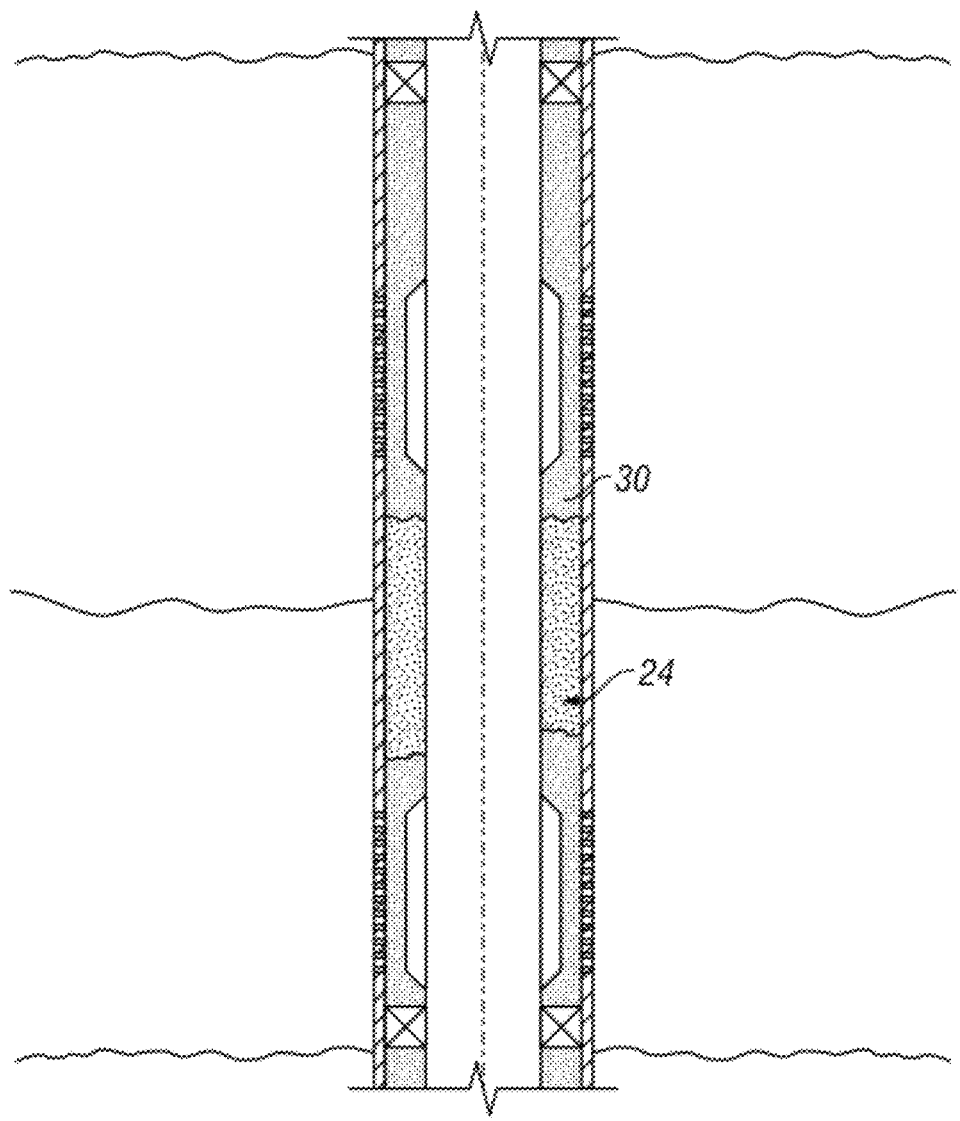
FIG. 2 depicts the multiple zones after gravel packing once the gel barrier has formed between the plurality of adjacent zones of the wellbore annulus.

FIG. 2 illustrates one of potentially several gel barriers assemblies 24 where the gel has formed within in a gravel pack 30 to isolate adjacent zones from each other within the wellbore annulus.

Figure 3:
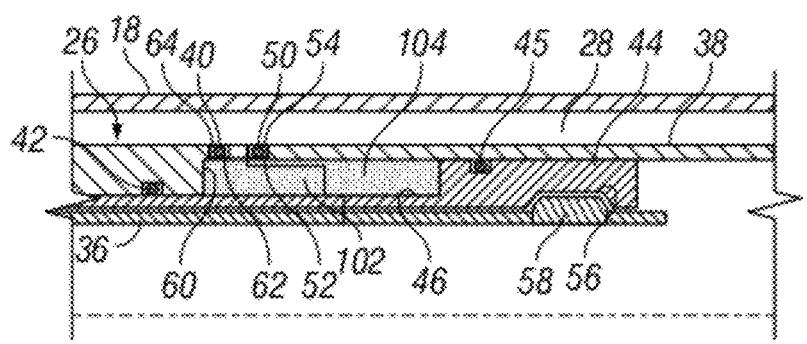
FIG. 3 is a detailed view of an embodiment of an apparatus that may aid in combining the solutions necessary to form the gel barrier.

A mechanism for releasing the solution from each container for forming a gel barrier is shown in FIG. 3. The outer completion string 26 has sections of blank pipe 38 with an internal shoulder 40 and a seal 42. A shifting piston 44 with a seal 45 is located within a blank pipe 38, so that a variable volume cavity 46 is defined between the shifting piston 44 and the blank pipe 38. The volume cavity 46 may have one or more containers, depicted as 102 and 104 here. The containers are connected to the openings 40 and 50 respectively. In this particular non-limiting embodiment, the shifting tool 58 may engage the recess 56 of the shifting piston 44 to apply force to the containers 102, 104.

Essentially, the shifting piston 44 pushes the first container 104 against the second container 102, which causes the rupture disks 62 and 52 to rupture the containers and release the solution from its respective container 102,104. Once released, the solutions may mix in the annulus and form a gel barrier. Or in another embodiment, either container may be designed to dissolve upon contact by any released solution or solution that may be added, so that a gel barrier forms once the silicate solution and the aqueous hardener solution have reacted with each other.

The shifting piston 44 has a recess 56 that is selectively engaged by the wash pipe 36 that supports a shifting tool 58. This shifting tool 58 may engage the recess 56 of the shifting piston 44 followed by a release of the recess 56 to allow the wash pipe 36 to continue uphole after the gravel pack crossover is removed. Thus, the production can start when the packer (FIG. 1) is tagged with a production string (not shown). As the wash pipe 36 moves further uphole, it can engage other recesses similar to 56 in other shifting pistons 44 further uphole, so that multiple gel barriers may form in the gravel pack within the annulus 28 to separate a plurality of adjacent zones.

Alternatively, one or more solutions may be fed to the variable volume cavity 46 at specific times, so that a gel barrier forms in a target area of the wellbore annulus. An alternative way to create gel barriers at desired annulus locations would be to expose openings 40, 50 in the blank pipe sections 38, pull out the wash pipe 36, and run in with a straddle tool (not shown) to straddle each opening 50. The solution(s) may be pumped from the surface through the various ports 50. The openings 40, 50 may have a discs 52, 62 and a distribution nozzles 54, 64. Doing so does add another trip into the well with the straddle tool and further requires proper placement of the tool and delivery of a predetermined volume of the solutions to the site.

Figure 4A:
FIG. 4a depicts a jar having glass beads mixed with a silicate solution and an aqueous hardener solution before a silica gel has formed.
Figure 4B:
FIG. 4b illustrates the strength of the silica gel by turning the jar upside-down, while maintaining the original position of the silica gel and glass beads.

FIG. 4a depicts a jar having 30 gram 6 mm diameter glass beads mixed with the solution of 30 ml 2.5% v/v sodium silicate solution and 3 ml 40% w/w glucono delta-lactone before a silica gel has formed. FIG. 4b illustrates the strength of the silica gel by turning the jar upside-down, while maintaining the original position of the silica gel and glass beads after the formation of the gel.

The single stage treatment may provide a permanent barrier between adjacent zones of a wellbore annulus. It should be appreciated that although the methods described herein have been notably described for use as a gel barrier between adjacent zones of a wellbore annulus, the methods may have other uses than those described within this application. The methods of using the gel barrier are considered successful even if less than a complete barrier has formed. Inhibition, reduction, diminishing, decreasing, and lessening of a fluid flow through the annulus by use of a gel barrier are all considered successful, as are the complete shut-off, prevention, cessation, stoppage, end and termination of fluid flow, that is, complete control of the fluid flow.

The above description is illustrative of an embodiment, and many modifications may be made by those skilled in the art without departing from the method whose scope is to be determined from the literal and equivalent scope of the claims below. The methods have been described with reference to specific embodiments thereof, and has been demonstrated as effective in providing a method of creating a gel barrier along a plurality of adjacent zones within a wellbore annulus, but is not necessarily limited thereto. For example, specific combinations of aqueous hardeners, silicate solutions, and other components falling within the claimed parameters, but not specifically identified or tried in a particular composition or under specific conditions, are anticipated to be within the scope of this method.

The present method may suitably comprise, consist or consist essentially of the elements disclosed and may be practiced in the absence of an element not disclosed. For instance, the method for generating a gel barrier within an annulus may consist of or consist essentially of combining at least two solutions within the annulus, wherein the at least two solutions comprise a first solution and a second solution and forming a gel barrier between adjacent zones along the annulus. The first and second solutions may be as defined in the claims.

The words "comprising" and "comprises" as used throughout the claims, are to be interpreted to mean "including but not limited to" and "includes but not limited to", respectively.

What is claimed is:

1. A method of generating a gel barrier within an annulus comprising:
    combining at least two solutions within the annulus, wherein the at least two solutions comprise a first solution and a second solution where the second solution is a lactone solution; and
    forming a gel barrier once the pH of the at least two solutions is lowered to at least about 8 pH between adjacent zones along the annulus, wherein the gel forms in the absence of any swelling or absorption of fluid by the gel upon combination of the at least two solutions.

2. The method of claim 1 where the annulus is within a wellbore.

3. The method of claim 1 where the first solution is a silicate solution selected from the group consisting of a sodium silicate solution, a potassium silicate solution, a lithium silicate solution, a rubidium silicate solution, a caesium silicate solution, and mixtures thereof.

4. The method of claim 1 where the ratio of the first solution to the second solution ranges from about 200:1 to about 1:1 by volume of the solutions.

5. The method of claim 1 further comprising separating a plurality of adjacent zones along an annulus by generating a gel barrier between each set of adjacent zones.

6. The method of claim 5 where at least two gel barriers have different consistencies from each other.

7. A method of generating a gel barrier within a wellbore annulus comprising:
    placing a first container in the wellbore annulus where the first container houses a first solution;
    releasing of the first solution from the first container;
    combining the first solution with at least a second solution where the at least second solution is a lactone solution; and
    forming a gel barrier once the pH of the at least two solutions is lowered to at least about 8 pH between adjacent zones along the wellbore annulus, wherein the gel forms in the absence of any swelling or absorption of fluid by the gel upon combination of the first solution and the at least second solution.

8. The method of claim 7 where the first solution is a silicate solution selected from the group consisting of a sodium silicate solution, a potassium silicate solution, a lithium silicate solution, a rubidium silicate solution, a caesium silicate solution, and mixtures thereof.

9. The method of claim 7 where the first container is a material selected from the group consisting of a polymer, an elastomeric material, a rubber, a metal, a glass, a dissolvable material, and combinations thereof.

10. The method of claim 7 where the releasing of the first solution from the first container occurs by a method selected from the group consisting of dissolving at least a portion of the first container, puncturing the first container, bursting the first container, and combinations thereof.

11. The method of claim 7 where the second solution is placed in the wellbore annulus by a method selected from the group consisting of spraying the second solution into the wellbore annulus, injecting the second solution into the wellbore annulus, housing the second solution in a second container and placing the second container into the wellbore annulus on a drill string, and combinations thereof.

12. The method of claim 7 where the ratio of the first solution to the second solution ranges from about 200:1 to about 1:1 by volume of the solutions.

13. A method of generating a gel barrier within a wellbore annulus comprising:
    placing a plurality of containers into the wellbore annulus where each container houses a solution where at least one solution is a lactone solution;
    rupturing the plurality of containers;
    combining the released solutions; and
    forming a gel barrier once the pH of the at least two solution is lowered to at least about 8 pH between adjacent zones along the wellbore annulus, wherein the gel forms in the absence of any swelling or absorption of fluid by the gel upon combination of the released solutions.

14. The method of claim 13 where the rupturing occurs by a method selected from the group consisting of dissolving at least one container, puncturing at least one container, bursting the first container, applying force to at least one container, applying heat to at least one container, applying pressure to at least one container, and combinations thereof.

15. The method of claim 13 where at least one solution is a silicate solution selected from the group consisting of a sodium silicate solution, a potassium silicate solution, a rubidium silicate solution, a caesium silicate solution, and mixtures thereof.

* * * * *